Dec. 30, 1947.  P. C. N. LAFORGE  2,433,815
APPARATUS FOR PRESSING FRUIT
Original Filed Sept. 13, 1935
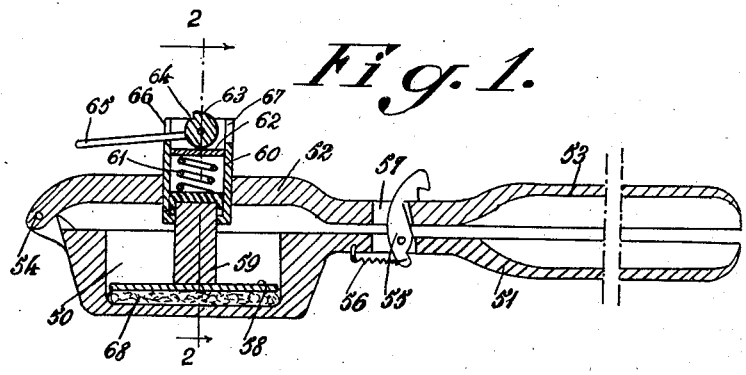
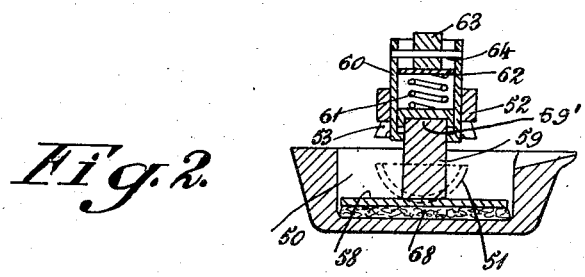
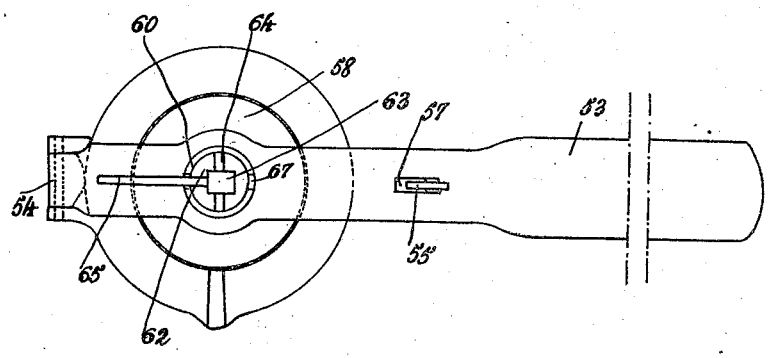
Inventor
Pierre, Charles, Nicéphore Laforge
by
Attorney Patented Dec. 30, 1947

2,433,815

UNITED STATES PATENT OFFICE 2,433,815

APPARATUS FOR PRESSING FRUIT

Pierre Charles Nicéphore Laforge,
Paris, France

Application September 13, 1935, Serial No. 40,472.
Renewed March 15, 1940. In Germany April
24, 1935

Section 3, Public Law 690, August 8, 1946
Patent expires April 24, 1955

2 Claims. (Cl. 100—41)

The present invention relates to an apparatus for pressing fruit.

The invention has for its object to provide an apparatus which on the one hand will enable the juice of the fruit to be expressed more completely, and on the other hand, will dispense with the ordinary filter device having holes or slots, which is a cause of breaking of the apparatus, whilst giving certainty of obtaining juice partially free from pulp and pips, irrespective of whatever size the pips may be.

The apparatus according to the invention, which is of the kind comprising two handles adapted to be fixed in relation to each other and a receptacle in which the fruit to be pressed is placed, is characterized by the fact that it is provided with a pressing plate movable in relation to the handle carrying it, this pressing plate being subjected to the action of an auxiliary pressure exerting device making it possible to further force it in the pressing direction within the receptacle containing the fruit to be pressed after said fruit has already been pressed by moving the handles toward each other to a position where they are locked against the possibility of their spreading apart.

Other advantages and characteristics of the invention will appear from the description which will now be given with reference to the annexed drawings which represent diagrammatically and simply by way of example a constructional form of an improved fruit pressing apparatus embodying my invention.

In the drawings:

Fig. 1 is a view of the apparatus in longitudinal section,

Fig. 2 is a cross sectional view of the same through the center of the pressing device, and, Fig. 3 is a plan view of the same.

In the constructional example shown, the apparatus comprises a lower element made by moulding or stamping any suitable material so as to form a receptacle 50 having a solid bottom, said receptacle having preferably a circular outline and being provided with a handle 51 extending therefrom, and an upper element likewise made by moulding or stamping any suitable material so as to form a plate 52 having another handle 53 extending therefrom. The receptacle 50 is preferably formed with a spout.

The upper element and the lower element are articulately connected to each other by means of a hinge or analogous device 54 so that in the closed position represented in Fig. 1 the plate 52 is directly above the receptacle 50.

The two handles 51 and 52 can be locked, in the closed position, in relation to each other, by means of a catch device 55 carried by one of the handles 51, which is actuated by a spring 56 and engages with the upper edge of a slot 57 in the other handle 53.

The upper element acts on the fruit to be pressed by means of a pressing plate 58, which is integral with a stem 59 slidably mounted within a vertical support 60 fixed to or integral with the plate 52. It is to be noted that the diameter of the plate 58 is slightly less than the internal diameter of the receptacle 50 so as to form therewith an annular filter.

The rod 59 is under the action of a spring 61 placed in the interior of the support 60 and bearing on the one hand against the upper face of a retaining cap 59' fastened onto the upper end of the said stem 59 and on the other hand against the lower face of a plate 62 slidably mounted within support 60. A cam 63, mounted so as to be capable of turning about a pivot 64 carried by the upper end of the support 60 bears against the upper face of plate 62. The cam 63 is provided with a lever 65 capable of imparting to the cam 63 a rotary movement of the order of 180°.

The rotation of the lever 65 is made possible by providing at the upper end of the support 60 two diametrically opposite slots 66 and 67.

The device is operated as follows:

The two elements 50, 52 being spread apart so that the pressing plate 58 clears receptacle 50. One half of the fruit to be pressed, such for example, as 68, is placed within the latter. The device is then closed by forcing the two handles 51 and 53 towards each other. The half fruit contained within receptacle 50 is thus pressed by the plate 58 and the juice that is expressed therefrom rises in the receptacle 50 above the said plate 58.

As soon as the two handles have been brought together and locked, a further squeezing of the fruit is produced by rotating the cam 63 about 180°. The cam acts on the plate 58 through the action of spring 61.

The spring, compressed to a high degree by the action of the cam, expands and restores the energy stored up during its compression, exerting a pressure on the fruit by means of cap 59', stem 59 and plate 58. From this it follows that the fruit is subjected to a considerable pressure against the bottom of the receptacle 50.

Due to the action of the cam, the device makes it possible to exert considerable pressure against the fruit so that the juice will be more nearly completely extracted therefrom. It is to be noted that the clearance existing between the plate 58 and the receptacle 50 is very small so that together they constitute a filter which is freed from obstruction each time the two elements of the device are moved apart. The juice of the fruit in rising above the said plate carries along neither pulp nor pips, except possibly the very smallest in size. A clear juice will therefore be attained without having recourse to an ordinary filter with holes, which is always liable to be obstructed and to be broken. It will be observed that catch 55 is formed with a plurality of teeth adapted to lock the two hinged elements at different positions. This makes it possible to use the device for pressing fruits of different thicknesses without having resource to any adjustments and without having to exert an excessive initial pressure for pressing a fruit. In fact at the start the catch can be set at the first step, giving a chance to the compressed spring to expand; then the spring is once more compressed by the action of the cam and is allowed to again expand further pressing the fruit. When the spring has expanded, the cam can be released, and the catch 55 can be set at its next step, when the same cycle of operation can be repeated.

It is obvious that the invention is in nowise limited to the embodiment which has been more especially described by way of example, but that it extends to all possible modifications coming fairly within the scope of the appended claims.

I claim:

1. Apparatus for pressing fruit comprising an open top receptacle provided with a laterally extending handle, a lever also provided with a handle articulately connected to said receptacle so as to be movable to and from the same, means for locking said lever against outward movement when brought to a fruit pressing position, a pressing plate having a stem slidably carried by said lever, adapted to press a fruit against the bottom of said receptacle when said lever is moved towards said receptacle, a spring pressing against said stem to force said plate outwardly, said spring becoming compressed by the reaction of the fruit against said plate and continuing the fruit pressing action as said spring gradually expands while said lever is restrained against outward movement by said locking means, a thrust plate for the outer end of said spring, movable towards said stem, and a cam bearing against said thrust plate adapted to force said thrust plate towards said stem so as to further compress said spring.

2. Apparatus for pressing fruit comprising an open top receptacle provided with a laterally extending handle, a lever also provided with a handle articulately connected to said receptacle so as to be movable to and from the same, means for locking said lever against outward movement when brought to a fruit pressing position, a pressing plate having a stem slidably carried by said lever, adapted to press a fruit against the bottom of said receptacle when said lever is moved towards said receptacle, a spring pressing against said stem to force said plate outwardly, said spring becoming compressed by the reaction of the fruit against said plate and continuing the fruit pressing action as said spring gradually expands while said lever is restrained against outward movement by said locking means, a thrust plate for the outer end of said spring, movable towards said stem, and a cam bearing against said thrust plate adapted to force said thrust plate towards said stem so as to further compress said spring, said locking means being adapted to lock said lever at different positions so that after expansion of said spring said lever may be moved one step inward, causing further compression of said spring, to be locked in its new position and allow for a new expansion of said spring.

PIERRE CHARLES NICÉPHORE LAFORGE.

REFERENCES CITED

The following references are of record in the file of this patent:

UNITED STATES PATENTS

| Number | Name | Date |
| --- | --- | --- |
| D. 89,057 | Pleiss | Jan. 17, 1933 |
| 462,429 | Erck | Nov. 3, 1891 |
| 508,304 | Goldenberger | Nov. 7, 1893 |
| 952,519 | Gilchrist | Mar. 22, 1910 |
| 1,014,222 | Hoppe | Jan. 9, 1912 |
| 968,344 | Hackney | Aug. 23, 1910 |
| 1,198,666 | Ryan | Sept. 19, 1916 |
| 1,959,615 | Derrah | May 22, 1934 |
| 2,018,932 | Thorne | Oct. 29, 1935 |

FOREIGN PATENTS

| Number | Country | Date |
| --- | --- | --- |
| 30,320 | Switzerland | Mar. 21, 1904 |
| 58,436 | Switzerland | May 11, 1912 |
| 149,650 | Switzerland | Dec. 1, 1931 |